United States Patent Office 2,824,044
Patented Feb. 18, 1958

2,824,044
PROCESS FOR THE MANUFACTURE OF 11-HYDROXY STEROID COMPOUNDS

Karl Miescher, Riehen, and Albert Wettstein and Friedrich Kahnt, Basel, Switzerland, assignors to Ciba Pharmaceutical Products, Inc., Summit, N. J.

No Drawing. Application May 21, 1951
Serial No. 227,533

Claims priority, application Switzerland May 26, 1950

12 Claims. (Cl. 195—51)

This invention relates to the manufacture of steroid compounds containing oxygen in 11-position.

A further object of the invention is a process for the introduction of oxygen into the 11-position of steroids.

Steroids containing oxygen in 11-position constitute important compounds. Thus many hormones of the suprarenal cortex contain such a group in 11-position, as for example corticosterone, 11-dehydrocorticosterone, 17α-hydroxycorticosterone and 17α-hydroxy-11-dehydrocorticosterone. A process for the manufacture of such compounds is therefore of greatest importance.

It is already known to produce steroids with oxygen in 11-position. Such a process usually starts from 12-hydroxy compounds from which for example water is split out followed by addition of water to the double bond produced by suitable intermediate reactions. This process is however very inconvenient and moreover proceeds with the production of unsatisfactory yields. More recently attempts have been made by biological methods to introduce a hydroxyl group directly into the 11-position by means of perfusion using surviving suprarenal glands. This process is however hardly worth consideration for commercial production. The intact suprarenal glands have therefore been replaced by slices or homogenizates of these organs. By this means however it has not been possible to obtain crystalline oxidation products. The production of 11-hydroxy compounds has only been presumed on the basis of a biological test.

According to the present invention oxygen can be introduced in a simple manner into the 11-position of steroids when steroids which are unsubstituted in the ring C are treated with oxygen or agents giving off oxygen in the presence of enzymes and substrates corresponding thereto and the 11-oxysteroids formed isolated.

The steroids unsubstituted in the ring C which are to be employed in the present process may be saturated or may possess double bonds for example in 3-, 4-, 5-, 6-, 7-, 8-, 9-, 11-, 16-, and/or 17-position. There are employed especially starting materials which belong to the androstane, pregnane, sterol, or sapogenin series and which are substituted e. g. in 3-, 14-, 16-, 17-, 20- or 21-position, for example by free or functionally converted hydroxyl or oxo groups, such as acyloxy-, for example acetoxy-, propionyloxy-, benzoyloxy- or tosyloxy groups, by alkoxy-, for example methoxy- or ethoxy groups, by enolized or acetalized oxo groups, by free or functionally converted carboxyl groups, such as nitrile or esterified carboxyl groups, by epoxy groups or by halogen atoms. The starting materials may be of any suitable steric configuration. Particularly valuable are for example $\Delta^4$-3:20-diketo-21-oxy-pregnenes, $\Delta^4$-3:20-diketo-17:21-dihydroxy-pregnenes, 3β-5α- or 5β-androsterones, cholesterol or diosgenin and their esters and ethers. If necessary any double bonds present in the steroids are intermediately protected in the manner known per se, e. g. by saturation with hydrogen halide or by conversion into pentacyclic isosteroids.

The treatment with oxygen is performed, e. g. by passing oxygen over or through the reaction mixture. As agents giving off oxygen there are used, for example, hydrogen peroxide or compounds forming hydrogen peroxide, for example, in the presence of catalase.

The enzymes are used in particular in the form of organ preparations of organs which are rich in enzymes, as e. g. minced organs, slices of organs or homogenates of organs, for example, adrenal glands, kidneys, livers, or of mixtures thereof.

To preserve the activity of the enzymes, suitable substrates must be used and suitable reaction conditions established. As substrates there are employed in particular those of the cyclophorase system or the compounds belonging, or closely related, to the citric acid-cycle, for example, citric acid, aconitic acid, isocitric acid, oxalsuccinic acid, α-ketoglutaric acid, succinic acid, fumaric acid, malic acid, pyruvic acid, oxalacetic acid, and also malonic acid, glutaric acid, adipic acid, glutamic acid, aspartic acid, asparagine, alanine, glycocoll, serine, furthermore, ascorbic acid, lactic acid, dihydroxytartaric acid, proline, tyrosine, tryptophane, or mixtures thereof.

In order to maintain suitable reaction conditions an aqueous medium is employed to which there are advantageously added components of physiological solutions, such as carbohydrates, inorganic and/or organic acids, for example sodium phosphate, alkali chlorides, magnesium sulfate or sodium acetate. The purpose of adding salts is especially to keep the pH and ionic strength of the reaction solution within optimal range during the reaction. The reaction is preferably carried out at a pH of 6.5–9.0 and a molar salt concentration of 0.5–0.01. Accordingly, a physiological liquid, e. g. plasma, may as well be used as reaction medium. In the latter case a preserving agent, for example, penicillin, is advantageously added. There can also be added to the reaction medium a solution promoter, such as ethylene glycol, propylene glycol or a dispersing agent, e. g. a phospholipoid.

Depending on the starting materials or reaction media used, the 11-hydroxysteroids are isolated from the oxidation mixture by known methods, e. g. by demixing, chromatography or recrystallization.

The following examples illustrate the invention, the relation between parts by weight and parts by volume being the same as that between the kilogram and the liter:

EXAMPLE 1

A solution of 1 part by weight of desoxycorticosterone in 20 parts by volume of ethylene glycol is added to 980 parts by volume of a mixture of 900 parts by volume of citrate plasma of beef, 80 parts by volume of ethylene glycol, and 1 part of ascorbic acid. The pH of this solution is re-adjusted with 0.1-n sodium hydroxide solution to the pH which the citrate plasma had before the addition of the ascorbic acid. 900 parts by volume of this mixture are warmed to 37° C. in a thermostat. To this are added 60 parts by weight of freshly prepared slices of suprarenal glands obtained from freshly slaughtered beef. In addition 60 parts by weight of suprarenal glands of beef are cut up into small pieces and homogenized for 2 minutes in a blender with 60 parts by volume of the above desoxycorticosterone plasma solution. The mixture produced is added to the solution in the thermostat to which the slices have already been added, using 20 parts by volume of plasma for rinsing. The mixture is maintained for ½ hour at 37° C. with occasional gentle movement. When the temperature has become constant 100 parts by volume of an aqueous 1.03 percent hydrogen peroxide solution containing 10 percent of ethylene glycol is added within 2 hours. After a further 2½ hours the whole is cooled to room temperature and thereupon pressed through a cloth filter. The turbid solution which passes through is cleared by centrifuging for 1 hour at 2000 revolutions per minute. The residue obtained on centrifuging is combined with the residue in the cloth filter.

The plasma solution and the filter residue which consists for the most part of fragments of organs, are separately treated with organic solvents. The plasma solution is extracted with ethyl acetate until the ethyl acetate appears to be colorless. The extraction solutions are centrifuged for ½ hour at 2000 revolutions per minute in order to obtain a clear separation of the layers and the ethyl acetate layers then siphoned off. In this manner 3.9 parts by weight of extract are obtained, which is fractionated by distribution in stages between methanol and heptane. The methanol fractions contain the steroids and are again distributed between heptane and methanol, then acetylated in pyridine with acetic anhydride at room temperature. The product thus obtained, on examination by paper-chromatography, shows the presence of a mixture of the acetates of desoxycorticosterone and corticosterone. For separation it is chromatographed on silica gel. The benzene-ether elutriates contain for the most part unchanged desoxycorticosterone. The oxidation product itself is removed from the chromatogram with ether-ethyl acetate mixtures. After hydrolysis by means of sodium bicarbonate in aqueous-alcoholic solution there is obtained therefrom a crystalline compound which melts at 179–181° C. (after sintering) and exhibits the optical rotation $[\alpha]_D = +220°$ (in alcohol) and which shows a green-yellow fluorescence with concentrated sulfuric acid which is a characteristic of corticosterone.

The residues of organs obtained from the reaction mixture by filtration and centrifugation are extracted for 40 hours with acetone. The acetone solution which contains the water present in the organs and the adhering plasma, is freed from acetone in a water pump vacuum. The aqueous residue is extracted by shaking several times with ether. After the evaporation of the ether 4.3 parts by weight of ether extract are obtained. This is further treated in an analogous manner to the ethyl acetate extract of the plasma. There follows a repeated distribution in stages between heptane and methanol. In this case also the methanol fractions are acetylated with acetic anhydride in pyridine and the acetylation mixture, after the complete removal of the pyridine and excess of acetic anhydride, separated by chromatography on silica gel. By hydrolysis of the ether-ethyl acetate elutriates and recrystallization the same compound is obtained as in the working up of the plasma extract.

EXAMPLE 2

159 parts by weight of finely cut suprarenal glands from beef are homogenized for 5 minutes with 900 parts by volume of an aqueous solution in a blender. The 900 parts by volume of the aqueous solution contain 6.4 parts by weight of sodium fumarate, 36 parts by weight of glucose, 7.24 parts by weight of sodium chloride, 3.72 parts by weight of potassium chloride, 7.14 parts by weight of secondary sodium phosphate, and 1.98 parts by weight of magnesium sulfate. To this homogenizate is added 1 part by weight of desoxycorticosterone and the whole is again homogenized for 2 minutes at the highest speed. The resultant mixture is adjusted to a pH 6.62 (measured with a glass electrode) with 20 parts by volume of 1-n hydrochloric acid, and homogenized once more for 2 minutes. The reaction mixture is poured into a vessel equipped with a stirrer, and 100 parts by volume of water used for rinsing. The pH of the emulsion is adjusted to 6.62 (determined with a glass electrode) with 20 parts by volume of 1-n hydrochloric acid. The reaction mixture is maintained at a temperature of 37° C. and 150 parts by volume of a 15% hydrogen peroxide solution added in the course of 2½ hours. In the course of the next hour, another 15 parts by volume of a 30% hydrogen peroxide solution are added. When the evolution of oxygen has ceased, there is added hourly 0.05 part by weight of a commercial catalase-preparation, so as to ensure the destruction after 4 hours of any hydrogen peroxide that might still be present. After a total reaction period of 4 hours, the solution is mixed with 30 parts by volume of 1-n hydrochloric acid; the pH of the mixture containing much protein precipitate is then 5.10. The reaction mixture is now admixed with 800 parts by volume of ethyl acetate and stirred well for 1 hour at 37° C. The mixture is then centrifuged. The supernatant ethyl acetate layer is siphoned off and the aqueous phase and the precipitate treated in the same manner over night with 500 parts by volume of ethyl acetate. This extraction is repeated 3 times during 2 hours, until the ethyl acetate layer is colorless. The combined ethyl acetate solutions are dried over anhydrous sodium sulfate and the filtered solution evaporated to dryness under reduced pressure. The residual semi-solid product is taken up in methanol saturated with heptane and distributed in 6 stages between a mixture of 400 parts by volume of heptane and 400 parts by volume of methanol. The methanol solutions of the first five stages are combined to obtain 5.82 parts by weight of a semi-solid, yellow-brown mass. Paper-chromatographic analysis of this crude product indicates the presence of corticosterone in addition to non-converted desoxycorticosterone. In order to isolate the oxidation product, the crude product is chromatographed on silica gel in known manner. The ether and chloroform elutriates contain desoxycorticosterone and the elutriates with chloroform-ethyl acetate and ethyl acetate contain the corticosterone which latter is readily recognized by the sulfuric acid reaction (green-yellow fluorescence). This corticosterone fraction is acetylated with acetic anhydride in pyridine and the corticosterone acetate of melting point 143–149° C. obtained on recrystallization from a mixture of acetone and ether. This acetate is hydrolyzed by means of potassium bicarbonate and finally recrystallized to obtain the corticosterone of melting point 179–182° C. and the specific rotation $[\alpha]_D = 223°$ (in alcohol) in the form of fine crystals.

EXAMPLE 3

113 parts by weight of finely cut suprarenal glands from beef are homogenized for 5 minutes in a blender with 250 parts by volume of an aqueous solution. The latter contain 0.574 part by weight of fumaric acid, 4.5 parts by weight of glucose, 0.91 part by weight of sodium chloride, 0.4 part by weight of potassium chloride, 0.91 part by weight of secondary sodium phosphate, 0.25 part by weight of magnesium sulfate, and 25 parts by volume of a 0.1-n sodium hydroxide solution. To this homogenizate is added 1 part by weight of desoxycorticosterone and the whole homogenized for another 2 minutes. The pH of this emulsion is 6.78. The emulsion is poured into a vessel equipped with a stirrer and gas inlet tube and stirred at 37° C. for 5 hours while introducing oxygen. The blender is rinsed with 50 parts by volume of water. The reaction liquid is added to 1500 parts by volume of acetone and the vessel rinsed twice with 200 parts by volume of acetone each time. The combined acetone solutions are separated from the precipitate by suction-filtering. The residue is washed three times with 200 parts by volume of hot acetone each time. The combined acetone solutions are freed from acetone in a vacuum produced by a water-jet pump. The residual aqueous solution is washed into an extraction vessel together with the precipitate resulting from the evaporation of the acetone and some separated oil, using 400 parts by volume of chloroform. The extraction of the aqueous layer is repeated 4 times with 400 parts by volume of chloroform each time. The last chloroform extracts are nearly colorless, whereas the first two have a strongly yellow-brown coloration. The chloroform extracts are combined, dried over anhydrous sodium sulfate, and the filtered solution evaporated to dryness under reduced pressure. The residue left after evaporation is a dark brown product weighing 14.5 parts. Paper-chromatography shows the presence of the product which is oxidized in 11-position, namely corticosterone, in addition to unchanged desoxycorticosterone. The crude extract is dissolved in 250 parts by volume of ether and the solution shaken with 200 parts by volume of a saturated solution of sodium bicarbonate. The clear yellow ethereal solution is mixed immediately with 50 parts by volume of 0.1-n hydrochloric acid and washed twice with 50 parts by volume of water each time. The mixture thus obtained is de-emulsified by the addition of 5 parts by volume of methanol and the ether layer evaporated to dryness. There is obtained a dry residue of 4.2 parts by weight of a yellow-brown mass. The latter is chromatographed on silica gel in known manner. The ether and chloroform elutriates consist of unconverted desoxycorticosterone. The chloroform-ethyl acetate extracts yield on paper-chromatography a mixture of desoxycorticosterone and corticosterone, whereas the ethyl acetate elutriates contain corticosterone and a yellow-colored product. The fractions containing corticosterone are purified and again chromatographed on silica gel. On recrystallization corticosterone of melting point 175° C. is obtained. This product is acetylized and the acetylation product purified by repeated recrystallization. The crystals melt at 140–146° C., the specific rotation is $[\alpha]_D = 219°$ (in alcohol), and the substance shows the typical color reaction with concentrated sulfuric acid. Paper-chromatographic analysis shows the product to be corticosterone acetate.

EXAMPLE 4

53 parts by weight of finely cut suprarenal glands from freshly slaughtered beef are homogenized for 3 minutes in a blender with 100 parts by volume of an aqueous solution containing 0.232 part by weight of fumaric acid, 1.8 parts by weight of glucose, 0.362 part by weight of sodium chloride, 0.186 part by weight of potassium chloride, 0.356 part by weight of secondary sodium phosphate, and 0.099 part by weight of magnesium sulfate. The pH of the solution is adjusted to 7.28 with 4 parts by volume of 2-n sodium hydroxide solution. After homogenization, the pH of the homogenizate is changed from 6.73 to 7.22 with 0.5 part by volume of 2-n sodium hydroxide solution. 20 parts by volume of propylene glycol are added to this mixture which is then homogenized for 1 minute. There are then added 25 parts by volume of propylene glycol containing 0.1 part by weight of substance S ($\Delta^4$-3,20-diketo-17$\alpha$,21-dihydroxy-pregnene) in solution. The whole is washed with 5 parts by volume of propyleneglycol and homogenized for 90 seconds. The emulsion is poured into a vessel equipped with a stirrer and gas inlet tube and oxygen passed through it in a thermostat at 37° C. while stirring. Excessive foaming is avoided by reducing the flow of oxygen and by the addition of a few drops of octanol. 30 minutes later the pH is 7.27, and after 3 hours it is 7.20. By the addition of 12 parts by volume of 1-n hydrochloric acid the pH is adjusted to 3.75, whereby much protein is precipitated and the red-brown color of the solution is changed to grey-brown.

The reaction mixture is poured into 2000 parts by volume of acetone and the reaction vessel washed three times with 100 parts by volume of acetone each time. The combined acetone solutions are allowed to stand at room temperature for 15 hours. The precipitate is separated from the yellow solution by suction-filtering and the residue washed three times with 100 parts by volume of hot acetone. The combined acetone solutions are completely freed from acetone under reduced pressure. The residual aqueous solution, and the precipitates and oils separated during evaporation are transferred to an extraction vessel along with 200 parts by volume of ethyl acetate. The aqueous phase is saturated by the addition of 25 parts by weight of sodium chloride and extracted four times with 100 parts by volume of ethyl acetate. The combined ethyl acetate solutions are washed twice with 60 parts by volume of water each time and extracted by shaking twice with 40 parts by volume of saturated sodium bicarbonate solution each time. The washing water and the bicarbonate solutions are combined and extracted with 100 parts by volume of ethyl acetate. The combined ethyl acetate solutions are washed with 50 parts by volume of water, then with 50 parts by volume of 0.01-n hydrochloric acid and then twice with 50 parts by volume of water. The orange-yellow ethyl acetate solution is dried over anhydrous sodium sulfate, filtered and evaporated to dryness under reduced pressure. As ethyl acetate extract there remain behind 3.4 parts by weight of a dark brown, greasy crystal mass.

The paper-chromatographic analysis of this crude extract reveals the presence of substance F ($\Delta^4$-3,20-diketo-11$\beta$,17$\alpha$,21-trihydroxy pregnene) in addition to unchanged substance S. The dark brown crystal mass is dissolved in 10 parts by volume of a solution of 50 parts by volume of benzene and 50 parts by volume of ether, chromatographed on silica gel in known manner and elutriated with ether, ether-chloroform mixtures, chloroform, chloroform-ethyl acetate mixtures, ethyl acetate, and ethyl acetate-methanol mixtures.

From the chloroform elutriate substance S crystallizes on evaporation, and from the ethyl acetate and ethyl acetate-methanol elutriates substance F is obtained. By repeated recrystallization from a mixture of ether, acetone and pentane and then from ether and acetone, there is separated from the fractions of the ethyl acetate elutriation a small quantity of an accompanying oil which considerably impedes crystallization. The product which by paper-chromatography is shown to be homogeneous, melts at 200–210° C. In admixture with analytically pure substance F it shows no depression of the melting point. Moreover, the crystals can be identified as substance F by means of the color reaction with concentrated sulfuric acid. The specific rotation is $[\alpha]_D = +156°$ (in alcohol). The chloroform-ethyl acetate elutriates, which in addition to substance F also contain substance S, are separated into their components by another chromatographic separation. The remaining elutriates from the silica gel chromatography, which contain a mixture of substances F and S, are combined with the mother liquors resulting from the aforementioned recrystallizations and acetylated in known manner with acetic anhydride in pyridine. The acetylation products are chromatographed on silica gel and the acetates are obtained in crystal form on evaporation of the elutriating agent. The crystals show a green yellow fluorescence with concentrated sulfuric acid and are pure substance F-acetate. They melt at 218–225° C. and their specific rotation in dioxane is $[\alpha]_D = +167°$.

EXAMPLES 5–31

*Examples 5–24.*—The reaction and the working up are conducted exactly as described in Example 4 with the substrates indicated in the following examples. As organs containing enzymes there are used suprarenal glands from beef and as starting material for the steroid oxidation 0.1 part by weight each of substance S ($\Delta^4$-3,20-diketo-17$\alpha$,21-dihydroxy-pregnene). If necessary, the pH of the reaction mixture is titrated back to the initial pH by the addition of 2-n sodium hydroxide solution or 2-n hydrochloric acid at certain stages of the experiments. As solution promoters there are used in each case 50 parts by volume of propylene glycol in the manner described in detail in Example 4. In each of these examples there are used as solvent 100 parts by volume of an aqueous solution containing in addition to the substrate 1.8 parts by weight of glucose, 0.362 part by weight of sodium chloride, 0.356 part by weight of secondary sodium phosphate, 0.099 part by weight of magnesium sulfate and the quantity of sodium hydroxide solution required for the titration to establish a pH of 7.5. Throughout the reaction period, oxygen is passed through the reaction mass.

*Example 25.*—In reaction sequences and methods of working up analogous to those described in Examples 4–24, there are used in this case as solvent promoter in lieu of propylene glycol 50 parts by volume of ethylene glycol in per se exactly the same manner.

*Examples 26–31.*—The reaction conditions are the same as in Examples 4–25, but no solution promoter is used.

of propylene glycol, the reaction period being varied in accordance with the reaction conditions indicated in the table below. The method of working described below also permits of the production from substance S ($\Delta^4$-3,20-diketo-17$\alpha$,21-dihydroxy-pregnene) of substance F ($\Delta^4$-3,20-diketo-11$\beta$,17$\alpha$,21-trihydroxy-pregnene) in crystalline form. After one recrystallization of the ethyl acetate elutriate of the crude extract chromatographed on silica gel, the melting point of the substance is at 185–200° C. The paper-chromatographic analysis and the color reaction with concentrated sulfuric acid prove the identity of this crystalline fraction with substance F.

EXAMPLES 32–35

*Oxidation of substance S into substance F*

| Example No. | Substrate | Parts by weight of substrate | Suprarenal glands, Parts by weight | Solvent. Same as in Examples 5–31, but— | Parts by volume | pH of the Reaction Solution | | | Total Reaction Period, Hours | Ethyl acetate Extract, Parts by weight |
|---|---|---|---|---|---|---|---|---|---|---|
| | | | | | | Initial | After 30 minutes | Final | | |
| 32 | Fumaric acid | 0.232 | 51 | without glucose | 100 | 6.78 | 6.78 | 6.78 | 4½ | 1.49 |
| 33 | do | 0.232 | 53 | do | 100 | 7.35 | 7.25 | 7.48 | 2½ | 3.14 |
| 34 | do | 0.232 | 34 | do | 100 | 7.32 | 7.54 | 7.54 | 1 | 1.99 |
| 35 | do | 0.232 | 53 | without glucose, without MgSO$_4$ | 100 | 7.38 | 7.56 | 7.49 | 2½ | 3.13 |

Instead there are used as solvent 150 parts by volume instead of only 100 parts by volume of the salt solution containing glucose. In each case 0.1 part by weight of substance S ($\Delta^4$-3,20-diketo-17$\alpha$,21-dihydroxy-pregnene) is added in the form of a fine powder directly to the homogenizate and the whole homogenized for another 3 minutes. The reaction is then caused to take place by the process described in Example 4 while introducing oxygen and the reaction mixture is worked up in an analogous manner. Finally, the desired substance F ($\Delta^4$-3,20-diketo-11$\beta$,17$\alpha$,21-trihydroxypregnene) is obtained in crystalline form and identified by paper chromatography.

The following table summarizes the experimental data characterizing Examples 5–31.

EXAMPLE 36

121 parts by weight of liver from freshly slaughtered calves are cut into cubes and homogenized for 3 minutes in a blender with 100 parts by volume of an aqueous solution containing 0.232 part by weight of fumaric acid, 1.8 parts by weight of glucose, 0.362 part by weight of sodium chloride, 0.186 part by weight of potassium chloride, 0.356 part by weight of secondary sodium phosphate, 0.099 part by weight of magnesium sulfate. The pH of the solution is first adjusted to 7.42 with 1.2 parts by volume of 2-n sodium hydroxide solution. After homogenization, the pH of the homogenizate is changed from 6.74 to 7.42 with 1.2 parts of 2-n sodium hy-

EXAMPLES 5–31

*Oxidation of substance S into substance F*

| Example No. | Substrate | Parts by weight of substrate | Parts by weight of suprarenal glands | pH of the reaction solution | | | | Total reaction period, Hours | Ethyl acetate extract, Parts by weight |
|---|---|---|---|---|---|---|---|---|---|
| | | | | Initial | After 30 minutes | Raised to— | Final | | |
| 5 | Citric acid | 0.420 | 47 | 6.58 | 6.81 | 6.85 | 7.00 | 3 | 2.23 |
| 6 | Succinic acid | 0.236 | 51 | 6.58 | 6.90 | | 6.71 | 2½ | 7.11 |
| 7 | Fumaric acid | 0.232 | 51 | 6.57 | 6.58 | | 6.55 | 4½ | 1.43 |
| 8 | do | 0.232 | 51 | 7.02 | 7.10 | | 7.08 | 3 | 3.11 |
| 9 | do | 0.232 | 51 | 7.45 | 7.45 | 7.50 | 7.41 | 3 | 3.51 |
| 10 | do | 0.232 | 51 | 7.98 | 7.70 | 7.99 | 7.85 | 3 | 1.95 |
| 11 | d,l-Malic acid | 0.356 | 51 | 6.50 | 6.52 | | 6.57 | 4½ | 1.2 |
| 12 | Malonic acid | 0.208 | 50 | 7.20 | 7.20 | | 7.10 | 3½ | 1.88 |
| 13 | Glutaric acid | 0.264 | 50 | 7.04 | 7.19 | | 7.09 | 3½ | 1.91 |
| 14 | Adipic acid | 0.292 | 50 | 7.20 | 7.15 | | 7.05 | 3½ | 1.80 |
| 15 | d,l-Glutamic acid | 0.584 | 54 | 7.14 | 7.01 | | 6.91 | 3 | 2.71 |
| 16 | d-Glutamic acid | 0.584 | 35 | 7.23 | 7.12 | 7.18 | 7.18 | 2½ | 2.27 |
| 17 | d,l-Aspartic acid | 0.532 | 54 | 7.18 | 7.05 | | 6.90 | 3 | 2.39 |
| 18 | d,l-Asparagin | 0.528 | 54 | 7.22 | 7.11 | | 6.95 | 3 | 2.90 |
| 19 | d,l-Alanin | 0.356 | 54 | 6.92 | 6.58 | 7.09 | 6.99 | 3 | 1.92 |
| 20 | Lactic acid | 0.180 | 50 | 7.17 | 7.12 | | 7.01 | 3½ | 2.29 |
| 21 | Dihydroxy tartaric acid | 0.364 | 51 | 7.04 | 7.02 | | 6.96 | 3½ | 1.90 |
| 22 | l-Ascorbic acid | 0.352 | 50 | 7.03 | 7.06 | | 6.91 | 3½ | 2.55 |
| 23 | Pyruvic acid | 0.166 | 47 | 6.49 | 6.69 | | 6.63 | 3 | 2.13 |
| 24 | do | 0.166 | 50 | 7.37 | 7.15 | 7.20 | 7.10 | 3 | 3.15 |
| 25 | Fumaric acid | 0.232 | 53 | 7.29 | 7.11 | | 7.11 | 2½ | 2.53 |
| 26 | cis-Aconitic acid | 0.348 | 47.5 | 7.38 | 7.13 | 7.46 | 7.22 | 3 | 1.30 |
| 27 | $\alpha$-Ketoglutaric acid | 0.292 | 47.5 | 7.48 | 7.28 | 7.45 | 7.27 | 3 | 1.13 |
| 28 | Glycocoll | 0.124 | 47.5 | 7.42 | 7.18 | 7.52 | 7.25 | 2½ | 1.29 |
| 29 | d,l-Serin | 0.210 | 47.5 | 7.42 | 7.05 | 7.42 | 7.28 | 2½ | 1.97 |
| 30 | l-Tryptophane | 0.408 | 41 | 7.50 | 7.17 | 7.52 | 7.30 | 2 | 0.74 |
| 31 | l-Tyrosine | 0.362 | 41 | 7.62 | 7.23 | 7.60 | 7.35 | 2 | 1.27 |

EXAMPLES 32–35

In a manner being otherwise the same as that indicated in Examples 4–31, there are used as solvent in each of Examples 32–35 100 parts by volume of a glucose-free salt solution and as solvent promoter 50 parts by volume droxide solution. To this mixture there is added 0.1 part by weight of substance S ($\Delta^4$-3,20-diketo-17$\alpha$,21-dihydroxy-pregnene) and the whole homogenized for 2 minutes. The emulsion is poured into a vessel equipped with a stirrer and gas inlet tube and oxygen passed through in a thermostat at 37° C. while stirring. Excessive foaming is avoided by reducing the flow of oxygen or adding a few drops of octanol. After 30 minutes the pH is 7.10. With 0.2 part by volume of 2-n sodium hydroxide solution it is adjusted to 7.27, and after 120 minutes it is changed from 7.12 to 7.26 by another addition of 0.2 part by volume of 2-n sodium hydroxide solution. After 3 hours the pH is 7.20. By the addition of 30 parts by volume of 1-n hydrochloric acid it is adjusted to 3.30, whereby much protein is precipitated and the brown color of the solution is changed to grey-brown.

The reaction mixture is poured into 3000 parts by volume of acetone and the reaction vessel rinsed 3 times with 250 parts by volume of acetone each time. The combined acetone solutions are allowed to stand at room temperature for 15 hours. The precipitate is then separated from the yellow solution by suction-filtering and the residue washed three times with 250 parts by volume with hot acetone each time. The combined acetone solutions are completely freed from acetone under reduced pressure. The residual aqueous solution and the precipitates and the oils which separate in the evaporation process are transferred into an extraction vessel together with 300 parts by volume of ethyl acetate. The aqueous phase is saturated by the addition of 25 parts by weight of sodium chloride and extracted 4 times with 100 parts by volume of ethyl acetate each time. The combined ethyl acetate solutions are washed twice with 60 parts by volume of water each time and extracted by shaking 4 times with 50 parts by volume of saturated sodium bicarbonate solution each time. The washing water and the bicarbonate solutions are combined and extracted with 100 parts by volume of ethyl acetate. The combined ethyl acetate solutions are washed with 50 parts by volume of water, then with 50 parts by volume of 0.1-n hydrochloric acid and then 3 times with 50 parts by volume of water each time. The orange-yellow ethyl acetate solution is dried over anhydrous sodium sulfate, filtered, and evaporated to dryness under reduced pressure. The ethyl acetate extract obtained consists of 3.03 parts by weight of a pale brown jelly which separates crystals over night.

Paper-chromatographic analysis of the crude extract shows the presence, in addition to unchanged substance S, of substance F ($\Delta^4$-3,20-diketo-11$\beta$,17$\alpha$,21-trihydroxy-pregnene). The pale brown crystal magma is dissolved in 10 parts by volume of a solution of 75 parts by volume of benzene and 25 parts by volume of ether and chromatographed on silica gel in known manner. It is elutriated with ether, ether-chloroform mixtures, chloroform, chloroform-ethyl acetate mixtures, ethyl acetate, and ethyl acetate-methanol mixtures.

Substance F crystallizes from the ethyl acetate and ethyl acetate-methanol elutriates. By repeated recrystallization from a mixture of ether, acetone and pentane and then from ether and acetone it is possible to obtain from the fractions of the ethyl acetate elutriates a crystalline product which is shown by paper-chromatography to be homogeneous and which melts at 200–210° C. The crystals can be identified by their color reaction with concentrated sulfuric acid as substance F ($\Delta^4$-3,20-diketo-11$\beta$,17$\alpha$,21-trihydroxy-pregnene). Their specific rotation is $[\alpha]_D = +156°$ (in alcohol). The elutriates of the silica gel chromatography, in which substances F and S are present in admixture, are combined with the mother liquors of the afore-described recrystallizations and acetylated in known manner with acetic anhydride in pyridine. The acetylized products are chromatographed on silica gel and the acetates obtained in crystalline form on evaporation of the elutriating agents. The crystals, which assume a green yellow fluorescence with concentrated sulfuric acid, melt at 218–225° C. and exhibit the specific rotation $[\alpha]_D = +167°$ in dioxane. Accordingly, they are the acetate of substance F.

EXAMPLES 37–42

The procedure of Examples 37–42 is in analogy to Example 36 and with the use of the substrates and enzyme-containing organs listed in the table below, 100 parts by volume of the glucose-containing salt solution being used as solvent in Example 37, and 150 parts by volume in each of Examples 38–42.

The introduction of oxygen in 11-position of substance S ($\Delta^4$-3,20-diketo-17$\alpha$,21-dihydroxy-pregnene) is possible also under these conditions. The working up procedure of Example 36 leads to the isolation of substance F ($\Delta^4$-3,20-diketo-11$\beta$,17$\alpha$,21-trihydroxy-pregnene) which melts at 200–210° C. The crystals are identified by paper-chromatographic analysis and the color reaction with concentrated sulfuric acid. Their specific rotation in ethanol is $[\alpha]_D = +156°$.

*Example 37.*—121 parts by weight of calf liver were homogenized.

*Examples 38–40.*—The enzyme-containing organ used in these experiments consisted of 55 parts by weight of rabbit liver in each case. Use was made thereof in a manner analogous to that of Example 36.

*Examples 41 and 42.*—In these experiments the source of enzymes was not liver, but calf kidneys; otherwise the reaction conditions were analogous to those of Example 36.

The other experimental data concerning Examples 37–42 are computed in the table below.

EXAMPLES 37–42

*Oxidation of substance S into substance F*

| Example No. | Substrate | Parts by weight of substrate | pH of the Reaction Solution | | | | | | | Total Reaction Period, Hours | Ethyl Acetate Extract, Parts by weight |
|---|---|---|---|---|---|---|---|---|---|---|---|
| | | | Initial | After 20 min. | After 40 min. | Raised to— | After 70 min. | Raised to— | Final | | |
| 37 | Citric acid | 0.420 | 7.42 | 7.17 | 7.15 | 7.28 | 7.19 | 7.30 | 7.22 | 3 | 2.05 |
| 38 | Fumaric acid | 0.232 | 7.45 | 7.32 | 7.25 | 7.40 | 7.33 | 7.62 | 7.44 | 3 | 1.47 |
| 39 | Ascorbic acid | 0.352 | 7.47 | 7.30 | 7.22 | 7.37 | 7.32 | 7.52 | 7.30 | 3 | 1.64 |
| 40 | d,l-Glutaminic acid | 0.584 | 7.44 | 7.33 | 7.23 | 7.38 | 7.33 | 7.56 | 7.44 | 3 | 2.65 |
| 41 | Fumaric acid | 0.232 | 7.30 | 7.13 | 7.19 | | 7.16 | | 7.14 | 3 | 3.18 |
| 42 | Citric acid | 0.420 | 7.39 | 7.31 | 7.38 | | 7.39 | | 7.31 | 3 | 3.21 |

What is claimed is:
1. The method of introducing an 11-hydroxyl substituent into a steroid containing an 11-methylene group which comprises mixing said steroid with a brei made from the adrenal cortex and subjecting the resultant mixture to the action of oxygen.

2. The method of oxidizing 11-desoxycorticosterone to corticosterone which comprises mixing 11-desoxycorticosterone with a brei made from the adrenal cortex and subjecting the resultant mixture to the action of oxygen.

3. The method of introducing an 11-hydroxyl substituent into a steroid containing an 11-methylene group which comprises mixing said steroid with a brei made from the adrenal cortex and subjecting the resultant mixture to the action of oxygen at a temperature of 37° C.

4. The method of oxidizing 11-desoxycorticosterone to corticosterone which comprises mixing 11-desoxycorticosterone with a brei made from the adrenal cortex and subjecting the resultant mixture to the action of oxygen at a temperature of 37° C.

5. A process for the preparation of an 11-hydroxy steroid, which comprises reacting a steroid unsubstituted in the ring C with a member selected from the group consisting of oxygen and an agent giving off oxygen in the presence of an enzyme, and the corresponding substrate, extracting the resulting reaction mixture with an organic solvent, and isolating the 11-hydroxy steroid in crystalline form from the thus-prepared organic solvent extract, the said enzyme being an oxidation-promoting enzyme and being contained in the adrenal cortex.

6. A process according to claim 5, wherein the 11-hydroxy steroid is isolated with the aid of an organic solvent.

7. A process according to claim 5, wherein the 11-hydroxy steroid is chromatographed with the aid of silica gel.

8. A process according to claim 5, wherein the extract is distributed between heptane and methanol, and the 11-hydroxy steroid is isolated from the residue of the methanol solution chromatographically with the aid of silica gel.

9. A process for the preparation of an 11-hydroxy steroid, which comprises isolating the 11-hydroxy steroid in crystalline form from an organic solvent extract of the reaction mixture resulting from the reaction of a steroid unsubstituted in the ring C with a member selected from the group consisting of oxygen and an agent giving off oxygen in the presence of an enzyme, and the corresponding substrate, the said enzyme being an oxidation-promoting enzyme and being contained in the adrenal cortex.

10. A process for the preparation of an 11-hydroxy steroid, which comprises isolating the 11-hydroxy steroid in crystalline form from an organic solvent extract of the reaction mixture resulting from the reaction of a steroid unsubstituted in the ring C with a member selected from the group consisting of oxygen and an agent giving off oxygen in the presence of an enzyme, and the corresponding substrate, with the aid of an organic solvent, the said enzyme being an oxidation-promoting enzyme and being contained in the adrenal cortex.

11. A process for the preparation of an 11-hydroxy steroid, which comprises isolating the 11-hydroxy steroid in crystalline form from an organic solvent extract of the reaction mixture resulting from the reaction of a steroid unsubstituted in the ring C with a member selected from the group consisting of oxygen and an agent giving off oxygen in the presence of an enzyme, and the corresponding substrate, by chromatography with the aid of silica gel, the said enzyme being an oxidation-promoting enzyme and being contained in the adrenal cortex.

12. A process for the preparation of an 11-hydroxy steroid, which comprises isolating the 11-hydroxy steroid in crystalline form from an organic solvent extract of the reaction mixture resulting from the reaction of a steroid unsubstituted in the ring C with a member selected from the group consisting of oxygen and an agent giving off oxygen in the presence of an enzyme, and the corresponding substrate, by distributing the said extract between heptane and methanol, and recovering the 11-hydroxy steroid from the residue of the methanol solution by chromatography with the aid of silica gel, the said enzyme being an oxidation-promoting enzyme and being contained in the adrenal cortex.

References Cited in the file of this patent

UNITED STATES PATENTS

| | | |
|---|---|---|
| 1,994,992 | Haas et al. | Mar. 19, 1935 |
| 2,360,447 | Schmidt et al. | Oct. 17, 1944 |
| 2,602,769 | Murray et al. | July 8, 1952 |
| 2,666,015 | Pincus et al. | Jan. 12, 1954 |
| 2,676,904 | Jeanloz et al. | Apr. 27, 1954 |

OTHER REFERENCES

Hyano et al.: Proc. Soc. Exptl. Bio. and Med., vol. 72, December 1949, pp. 700–701.